(12) United States Patent
Bakke (10) Patent No.: US 7,100,202 B2
(45) Date of Patent: Aug. 29, 2006

(54) VOICE FIREWALL

(75) Inventor: Steve Bakke, Dallas, TX (US)

(73) Assignee: Tekelec, Morrisville, NC (US)

( * ) Notice: Subject to any disclaimer, the term of this patent is extended or adjusted under 35 U.S.C. 154(b) by 800 days.

(21) Appl. No.: 10/086,604

(22) Filed: Mar. 1, 2002

(65) Prior Publication Data

US 2002/0124189 A1 Sep. 5, 2002

Related U.S. Application Data

(60) Provisional application No. 60/272,917, filed on Mar. 2, 2001.

(51) Int. Cl.
*G06F 9/34* (2006.01)
*G06F 15/173* (2006.01)

(52) U.S. Cl. .................. 726/11; 709/238; 709/227; 709/220; 370/254

(58) Field of Classification Search ............... 713/201; 709/220, 227, 738; 370/254; 726/11
See application file for complete search history.

(56) References Cited

U.S. PATENT DOCUMENTS

| | | | |
|---|---|---|---|
| 6,697,377 B1 * | 2/2004 | Ju et al. ................... 370/466 |
| 6,711,618 B1 * | 3/2004 | Danner et al. .............. 709/228 |
| 6,718,030 B1 * | 4/2004 | Turner et al. .......... 379/221.02 |
| 6,738,803 B1 * | 5/2004 | Dodrill et al. .............. 709/218 |
| 6,772,347 B1 * | 8/2004 | Xie et al. ................... 713/201 |
| 6,822,957 B1 * | 11/2004 | Schuster et al. ............ 370/389 |
| 6,868,080 B1 * | 3/2005 | Umansky et al. ........... 370/354 |
| 6,883,015 B1 * | 4/2005 | Geen et al. ................. 709/203 |
| 2002/0035699 A1 * | 3/2002 | Crosbie ...................... 713/201 |
| 2004/0210674 A1 * | 10/2004 | Gbadegesin ............... 709/249 |

* cited by examiner

*Primary Examiner*—Christopher Revak
*Assistant Examiner*—Eleni Shiferaw
(74) *Attorney, Agent, or Firm*—Haynes and Boone, LLP (57) ABSTRACT

A voice firewall for providing communication between a user endpoint at a user location and a provider endpoint at a provider location is provided. The voice firewall includes a command input port for receiving a connect command that includes a private connection address embedded within a data portion of the connect command. The voice firewall is configured to manipulate the connect command by substituting a public connection address for the private connection address. The voice firewall also includes a voice communication port that is associated with the private connection address on a private side of the firewall and the public connection address on a public side of the voice firewall.

23 Claims, 4 Drawing Sheets

VOICE FIREWALL

CROSS-REFERENCE TO RELATED APPLICATIONS

This application claims the benefit of U.S. Provisional Application No. 60/272,917, filed Mar. 2, 2001, which is hereby incorporated by reference.

BACKGROUND OF THE INVENTION

1. Field of the Invention

This invention relates generally to telecommunications call processing and in particular to a voice firewall that facilitates communication and provides protection for telephony components connected via a private network to a public network.

2. Description of Related Art

Interest in sending voice communications over the Internet has grown rapidly in recent years. The idea first became a reality with the introduction of Internet telephone software that was designed to run on a personal computer (PC) having a sound card, speakers, microphone, and a modem. The software compressed voice communications and encoded them into internet protocol (IP) packets for transmission over the Internet. Although this telephone software allowed two parties to communicate using the Internet as a transmission medium, both parties were required to use a PC running the telephone software.

Transmitting voice communications over the Internet (commonly referred to as voice over IP, or VoIP) presents many advantages. The most compelling is reduced cost. For telephone companies, a VoIP network carries voice communications cheaper than traditional switched circuit telephone networks because available bandwidth is more efficiently used. A public switched telephone network (PSTN) allocates a 64 kilobit per second end-to-end circuit for each call. A VoIP network using the same bandwidth carries a much higher number of calls by compressing voice data into "packets" that are transmitted according to IP. The ability to carry more calls results in significant cost savings to the telephone company.

For the everyday user, VoIP communication reduces costs by allowing the user to bypass per-minute, long distance telephone charges over the PSTN. Currently, the only charge incurred while communicating over the Internet is a periodic charge, such as a monthly charge levied by the Internet Service Provider.

Since the first software packages enabling voice communication over IP networks, software and hardware developers have significantly enhanced the cost effectiveness and practicality of using VoIP. One of the most wide-reaching advances is the use of gateways to connect VoIP networks to traditional PSTNs. Gateways process voice signals to enable communication between VoIP devices and standard telephones on the PSTN.

IP telephones are very often connected to private networks, especially private LANs. Private LANs connected to public networks, such as the Internet, typically use a firewall to "hide" devices on the LAN from the outside world. A conventional firewall, such as a network address translation (NAT) firewall, allows all IP devices within a business to share a single public (i.e. Internet) IP address. All the devices within the business LAN use private IP addresses. Therefore, devices on the LAN are invisible to devices outside the LAN. This presents several problems for Internet telephony since telephones on remote private LANs, public networks, or the PSTN calling an IP telephone on a private LAN will not be able to "see," and thus communicate with, the IP telephone.

Figure 1:
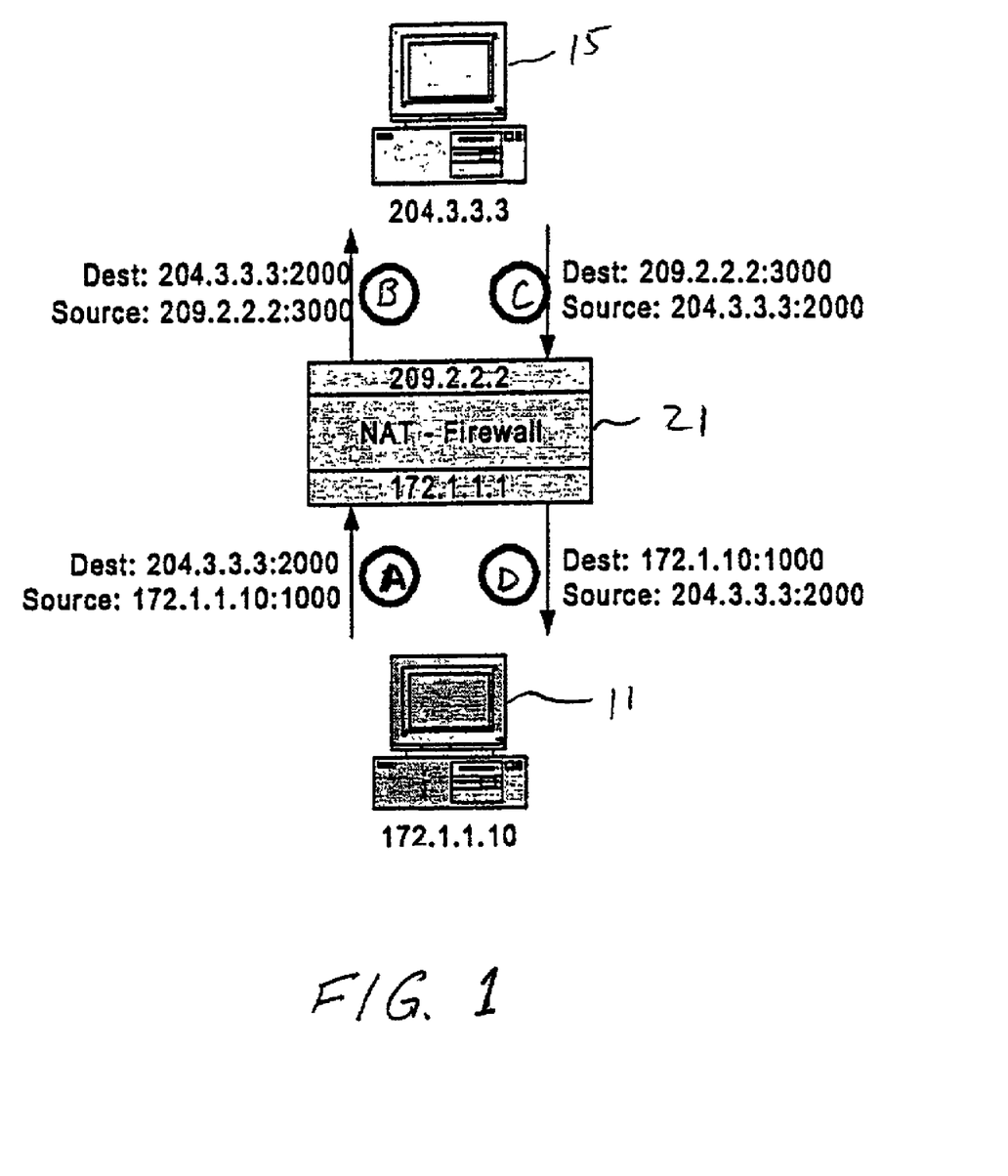
FIG. 1 illustrates the operation of a conventional firewall which is connected between a private LAN and a public network.

Referring to FIG. 1 in the drawings, the basic operation of a conventional firewall is described in more detail. A first device 11 such as a personal computer (PC) is located on a private LAN. First device 11 desires to communicate with a second device 15 that is located on a public network (i.e. Internet Address space). A conventional firewall 21 forms a bridge between the private LAN and the public network. In a first step A, first device 11 sends a user datagram protocol (UDP) original packet to second device 15. This packet has a public destination address/port of 204.3.3.3:2000 associated with second device 15 and a private source address/port of 172.1.1.10:1000 associated with first device 11. A person having skill in the art will recognize that the actual IP addresses could vary and are shown for illustrative purposes only. Since the packet's destination address is a public address and since firewall 21 is specified as the default gateway on first device 11, the packet is sent to firewall 21. Firewall 21 receives the packet and, because it is the first packet with this source and destination address/port, a new session is created in firewall 21. The session records the source and destination address/port of the packet, plus it allocates a port for returning packets. In the illustrated case, the allocated return port is port 3000.

In step B firewall 21 relays the packet to the public network, but firewall 21 replaces the original source address/port with a firewall source address/port, the firewall port being the return port allocated for the newly created session. Second device 15 receives the packet and because of the source address/port change, the second device is totally unaware of the address/port of first device 11.

In step C second device 15 responds by sending a return packet back to what second device 15 believes is the original packet's source, the firewall source address/port. Firewall 21 receives the return packet at port 3000, looks up the session associated with port 3000, and then uses the information to route the return packet to first device 11. In step D firewall 21 relays the return packet to first device 11, replacing the destination address given by second device 15 (i.e. the firewall address) with the address/port of first device 11.

The preceding operational description illustrates that the act of sending a packet from a local device opens a temporary "hole" in firewall 21 for packets that are returned to the local device. The hole is only open for packets that exactly match the firewall source address/port. No other packets are sent through the hole. After a few minutes of inactivity, the hole is automatically closed.

As mentioned previously, a conventional firewall attached to a private LAN prevents the visibility of an IP telephone that is connected to the private LAN. Although an IP telephone could call another IP telephone on a public network, the private IP telephone could not call an IP telephone connected to another private LAN because each of the telephones on the two private LANs are not visible to the other. Similarly, an IP telephone would have difficulty connecting to a PSTN gateway at a service provider since the service provider likely protects devices on the service provider network with a conventional firewall.

A need exists, therefore, for a method of providing communication between two IP devices connected to different private networks. A need also exists for a method of providing communication between a provider endpoint at a provider location and a user endpoint at a user location where both the provider endpoint and the user endpoint are located behind conventional firewalls. Finally, a need exists for a voice firewall in the form of a computer program product that facilitates communication between the provider endpoint and the user endpoint.

BRIEF SUMMARY OF THE INVENTION

The problems presented in communicating between two IP devices located behind separate firewalls are solved by the systems and methods of the present invention. In accordance with one embodiment of the present invention, a voice firewall is provided. The voice firewall includes a command input port for receiving a connect command that includes a private connection address embedded within a data portion of the connect command. The voice firewall is configured to manipulate the connect command by substituting a public connection address for the private connection address. The voice firewall also includes a voice communication port that is associated with the private connection address on a private side of the firewall and the public connection address on a public side of the voice firewall.

In another embodiment of the present invention, a method of providing communication between a provider endpoint at a provider location and a user endpoint at a user location is provided. A soft switch at the provider location sends a connection signal that includes a private connection address embedded within a data portion of the connection signal. The private connection address points to the provider endpoint, which is where a voice call for the user endpoint awaits. The connection signal is received and modified such that a public connection address is substituted for the private connection address. A voice communication port links the public connection address to the private connection address. The connection signal is sent to the user endpoint, which then initiates a voice call by sending a signal to the public connection address.

In another embodiment of the present invention, a computer program product is embodied within a computer readable medium. The computer program product includes instructions for receiving a connection signal from a provider endpoint, instructions for substituting a public connection address for a private connection address within a data portion of the connection signal, and instructions for sending the modified connection signal to a user endpoint.

Other objects, features, and advantages of the present invention will become apparent with reference to the drawings and detailed description that follow.

DETAILED DESCRIPTION OF THE PREFERRED EMBODIMENT

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical mechanical, electrical, and software changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

The technology driving the Internet is changing rapidly. Along with this rapid change, new terms of art are frequently introduced. These terms of art are often adopted and used by the general public, with the terms sometimes being loosely used to describe elements and events not originally included in the meanings of the words. Therefore, the following terms are defined to clarify their use in the context of the present invention. The definitions are not intended to be limiting and are not intended to replace alternative meaning known by persons having skill in the art.

The term "Internet" refers to a network comprised of other networks, and includes commercial, academic and government networks from around the world.

The term "Internet Service Provider" (ISP) refers to a company or organization that provides other companies or individuals with access to the Internet.

The term "Internet telephony" refers to the process of communicating voice signals over a digital network such as the Internet.

The term "modem" is an abbreviation for a modulator/demodulator, which is an electronic device for converting serial data from a computer into an audio signal suitable for transmission over conventional telephone lines.

The term "network" is intended to refer to a group of interconnected information handling systems, such as computers, and the communications channels which connect them.

The term "public switched telephone network" (PSTN) generally refers to the worldwide voice telephone network that is accessible to those having telephones and access privileges.

The term "World Wide Web" (Web), which is actually an Internet facility, is commonly used as a synonym for Internet. The Web has as its foundation the hyper-text markup language (HTML) document, which may contain links to other documents on the same Web server or on servers anywhere in the world. The Web uses the Hypertext Transfer Protocol (HTTP) to download Web pages to a browser, such as Netscape Navigator or Microsoft Internet Explorer.

A "Uniform Resource Locator" (URL) is the address that defines the route to a file on the Web or any other Internet facility. URLs can be typed into the browser to access Web pages, or embedded within Web pages themselves to provide HTTP links to other pages.

A "web site" is a document or collection of documents consisting of at least one HTML document, and in most instances, graphics, text documents, java scripts or other information. A web site may be saved on a single computer or network server, and can be viewed using a browser. Often a web site is made available to the Internet.

Figure 2:
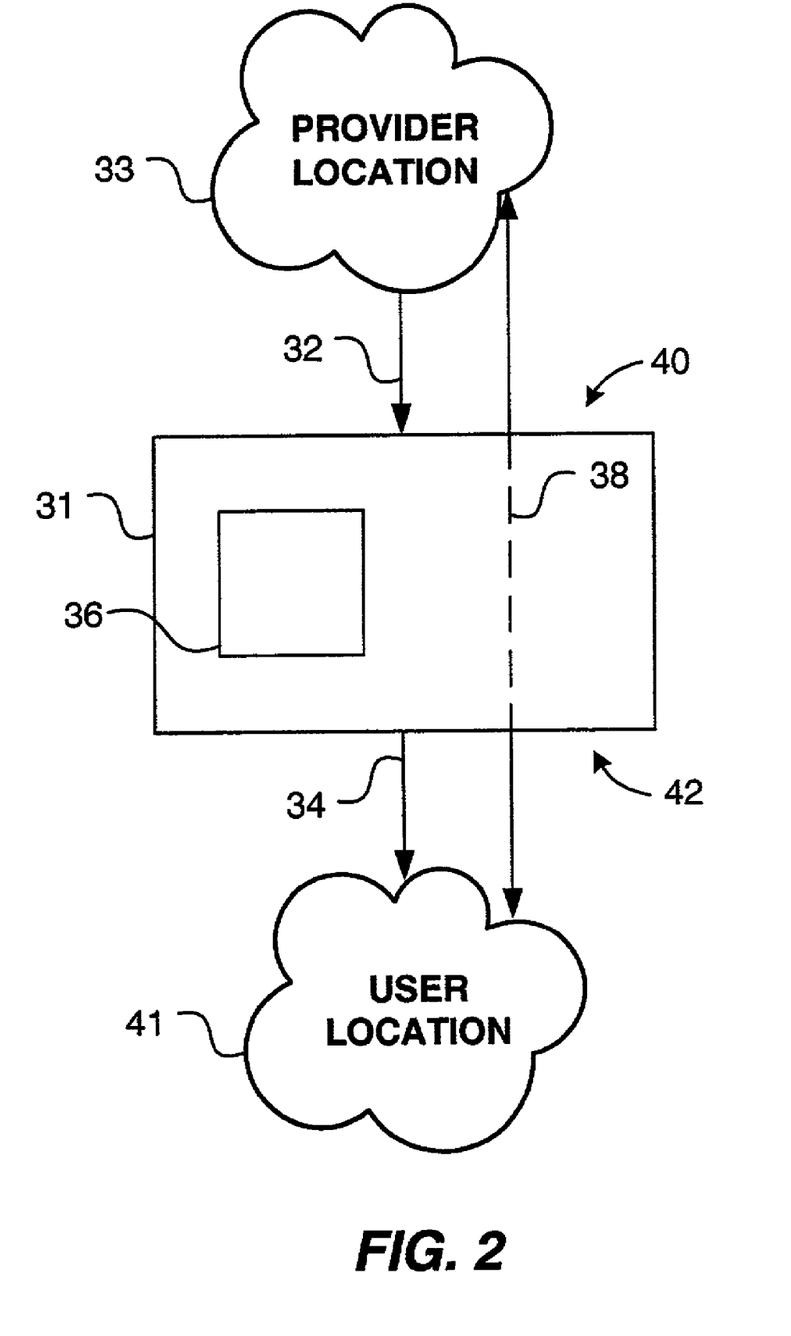
FIG. 2 depicts a voice firewall according to the present invention having a command input port, a command output port, and a voice communication port.
Figure 3:
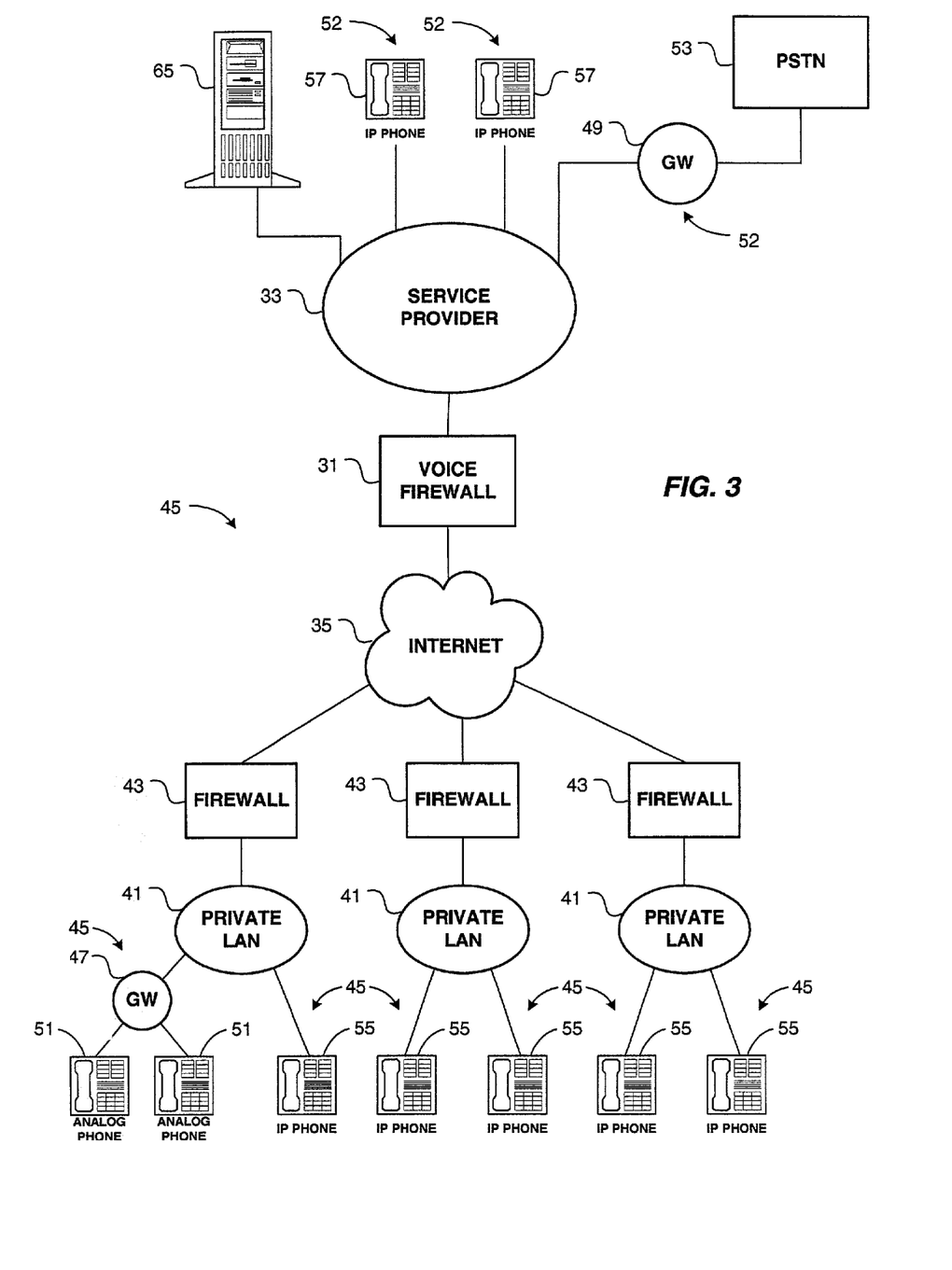
FIG. 3 illustrates the voice firewall of FIG. 2 connected to a service provider, the voice firewall facilitating communication between a user endpoint and a provider endpoint.

Referring to FIGS. 2 and 3 in the drawings, a voice firewall 31 according to the present invention is electrically connected to a provider location 33 (e.g. service provider) on a private side 40 of the voice firewall 31 and a public network 35 such as the Internet on a public side 42 of the voice firewall. Voice firewall 31 includes a command input port 32 and a command output port 34. Voice firewall 31 also includes a processor 36 electrically connected to command input port 32 and command output port 34. Processor 36 is configured to open a voice communication port 38 to allow voice communications to pass through the voice firewall as described in more detail below.

A plurality of user locations 41 (e.g. private LANs) are connected to public network 35, each user location 41 being protected by a conventional firewall 43. Each user location 41 includes a plurality of user endpoints 45, such as IP telephones, IP fax machines, IP gateways, or any other IP device. IP gateways typically serve as a bridge between an IP network and an analog network. At one of the user locations 41, an IP gateway 47 is electrically connected to a plurality of conventional analog telephones 51 to allow users to communicate from these telephones over the IP network. IP gateway 47 could also be connected to a wide variety of other analog devices. Each provider location 33 includes a plurality of provider endpoints 52, which may include IP telephones, IP fax machines, IP gateways, or any other IP device. An IP gateway 49 at provider location 33 could be connected to a PSTN 53, an analog telephone, or another analog device.

IP telephones 55 electrically connected at user location 41 are one type of user endpoint 45. IP telephones 55 typically connect directly to the IP network at user location 41 and require no analog to digital conversion for signals generated at the IP telephone 55. An example of an IP telephone is model number 7960 manufactured and sold by Cisco Systems, Inc. Provider location 33 may also include IP telephones 57. Although not required, IP telephones 57 may be of similar make and model as IP telephones 55.

A soft switch 65 is electrically connected at provider location 33 and cooperates with voice firewall 31 to provide communication between user endpoints 45 and provider endpoints 52. Soft switch 65 maintains a lookup table of all user endpoints 45 attached to the provider location 33 via user locations 41. When incoming calls are routed to soft switch 65, soft switch 65 coordinates with voice firewall 31 to insure that a voice connection is made between the proper end points. This connection process is described in more detail below.

Soft switch 65 maintains a command session with each user endpoint 45. The soft switch 65 communicates with each user endpoint via a protocol such as Session Initiation Protocol (SIP), Media Gateway Control Protocol (MGCP), or Skinny Client Control Protocol (SCCP). When an IP telephone 55 is first plugged into an IP network, a boot-up procedure is performed in which the IP telephone 55 contacts soft switch 65. The IP telephone 55 is configured with the IP address and port of voice firewall 31, which forwards commands to soft switch 65. The command session that is initially established between IP telephone 55 and soft switch 65 is maintained as long as IP telephone 55 and soft switch 65 maintain an electrical connection with their respective networks. The command session allows the transfer of command signals between the IP telephones and the soft switch. Each command signal communicates a telephony operation associated with that particular IP telephone. For example, if a user at one of the user locations 41 picks up the handset of one of the IP telephones 55 to place a call, a "Connect" signal is communicated to soft switch 65. Similarly, if an incoming call is to be delivered to IP telephone 55, soft switch 65 will send a Connect command to IP telephone 55.

Referring still to FIGS. 2 and 3, the operation of voice firewall 31 is demonstrated by illustrating an incoming call to a selected IP telephone 55 (i.e. a selected user endpoint 45) at user location 41. For an incoming call from PSTN 53, an analog signal is received at gateway 49. Although gateway 49 is capable of digitizing the analog signal and transmitting it to a digital user endpoint, the gateway 49 cannot "see" the IP phone 55 behind firewall 43. Therefore, gateway 49 signals soft switch 65 that an incoming call has been received for the selected IP telephone 55. Soft switch 65 creates a Connect command to transmit to the selected IP telephone 55 along the command session with that telephone 55. The Connect command is a digital packet that contains a data portion and an address portion. The address portion of the packet includes information on the source address of the packet (i.e. soft switch 65) and the destination address of the packet (i.e. selected IP telephone 55).

The soft switch directs the Connect command to the proper IP telephone 55 by looking up the address of the IP telephone 55 in the lookup table of user endpoints 45. Included in the Connect command packet is a private connection address. The private connection address refers to the location of the incoming voice call. In this particular situation, the incoming voice call is waiting at gateway 49. The private connection address is included in the data portion of the packet since the source address associated with the address portion of the packet will point to soft switch 65 in communications from soft switch 65 to selected IP telephone 55. After leaving soft switch 65, the Connect command travels first to the command input port 32 of voice firewall 31.

Figure 4:
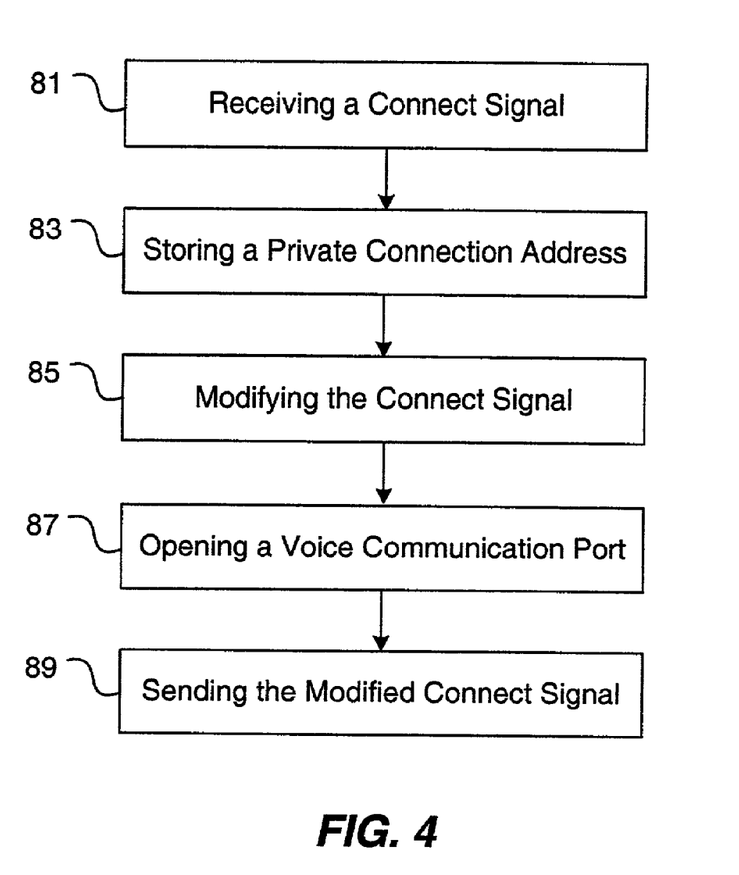
FIG. 4 depicts the operation of the voice firewall of FIG. 2 according to one embodiment of the present invention.

Referring to FIG. 4 in the drawings, voice firewall 31 receives the Connect command 81 from soft switch 65. Voice firewall 31 then stores the private connection address 83 and modifies the data portion of the Connect command 85 by substituting a public connection address for the private connection address. The public connection address includes the public address of the voice firewall and a voice communication port (see item 38 in FIG. 2) which is assigned by the voice firewall. The voice firewall opens the voice communication port 87 and associates the voice communication port with the private connection address contained in the data portion of the Connect command. In the present example, the voice communication port is associated with gateway 49. Finally, the voice firewall sends the modified Connect command 89 to user endpoint 45, which in this case is the selected IP telephone 55.

After receiving the modified Connect command, selected IP telephone 55 examines the data portion of the Connect command and obtains the public connection address from the data portion of the Connect command. It is important to note that at this point, no voice connection has been made by the selected IP telephone 55 to the incoming voice call. Instead, the Connect command, in actuality just an instruction to connect, has been sent from soft switch 65 to selected IP telephone 55. The public connection address points to the public address and the voice communication port on voice firewall 31 that is associated with the private address of gateway 49, which is where the incoming call for selected IP telephone 55 is waiting. Selected IP telephone 55, after obtaining the public connection address, sends a signal to provider endpoint 52 (in this case gateway 49) requesting connection with the voice call. The selected IP telephone 55 creates a voice call signal where an address portion of the voice call signal has a source address/port of the selected IP telephone 55 and a destination address/port of gateway 49. Since the IP telephone 55 is "initiating" the voice call signal, gateway 49 will be able to communicate subsequent voice signals back to selected IP telephone 55 via the public proxy address that is substituted for IP telephone 55 at conventional firewall 43. By providing a soft switch 65 that maintains a command session with each user endpoint 45, and by providing a voice firewall 31 that is capable of manipulating the data portion of a Connect command sent from soft switch 65, a selected user endpoint 45 is able to communicate with provider endpoint 52 despite the virtual invisibility of the endpoints 45, 52 to each other due to firewall protection at both provider location 33 and user location 41.

The advantages provided by soft switch 65 and voice firewall 31 are also applicable to other types of incoming calls, as well as outgoing calls. For example, an incoming call may originate at another provider endpoint 52, perhaps one of the IP telephones 57. An incoming call from IP telephone 57 will signal soft switch 65, just as gateway 49 signaled soft switch 65 in the previous example. Soft switch 65, which already maintains a command session with the user endpoint 45 to which the call is directed, will generate a Connect command having the private connection address of IP telephone 57 inserted in the data portion of the Connect command. Voice firewall 31 will substitute a public connection address for the private connection address in the data portion and will open a voice communication port linked to the private connection address of IP telephone 57. When user endpoint 45 receives the Connect command, the user endpoint 45 will generate a new voice call signal directed to the public connection address, and a voice communication link will be established between user endpoint 45 and IP telephone 57.

In some cases, an incoming call may originate at one user endpoint 45 (e.g. an IP telephone 55) with a destination of another user endpoint 45. If a first IP telephone 55 places a call to a second IP telephone 55 at the same user location 43 (i.e. on the same private LAN), the voice firewall 31 detects that both IP telephones 55 are at the same user location 43 and will not modify the Connect command. Instead the two IP telephones 55 will be instructed to communicate directly with each other, thereby bypassing voice firewall 31 during voice communication. This technique is referred to as endpoint short circuiting.

For an outgoing call placed from a user endpoint 45 that is directed to a provider endpoint 52, the process is similar to the processing of incoming calls. When an IP telephone 55 is picked up, an Off-Hook command is transmitted to the soft switch 65 via the command session. Soft switch 65 scans the look-up table to determine if the telephone number being called is one associated with provider location 33 or with any of the user locations 41 serviced by provider location 33. If the telephone being called is linked to another user location 41 serviced by provider location 33, Connect commands are sent to both telephones instructing them to send voice communications to voice firewall 31. Voice firewall 31 then relays voice signals between the two sessions at the voice firewall 31. If the telephone being called is accessible through PSTN 53, soft switch 65 signals gateway 49 to make a connection with the correct telephone on the PSTN 53. Soft switch 65 then sends a Connect command to the IP telephone 55 that originated the call.

After the voice firewall 31 has modified the data portion of the Connect command as previously described, the IP telephone 55 initiates a voice connection with the PSTN using the public connection address in the Connect command.

Voice firewall 31 also performs the conventional firewall functions described previously. Additionally, voice firewall 31 provides authentication for boot commands received from user endpoints 45. When a boot command is received, a challenge/response authentication is performed by soft switch 65. If user endpoint 45 does not authenticate, soft switch 65 no longer communicates with that particular user endpoint 45, and voice firewall 31 no longer passes any commands from that user endpoint 45. Voice firewall 31 can also be configured to only accept commands from an access list of known user endpoints 45. If this configuration is employed, packets originating from user endpoints not on the access list are discarded.

Figure 5:
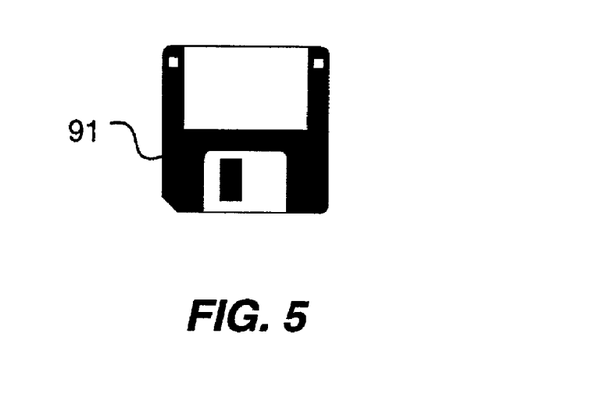
FIG. 5 illustrates a computer readable medium having a computer programming product for performing the voice firewall operations of one embodiment of the present invention.

Referring to FIG. 5 in the drawings, a computer readable medium 91 in the form of a computer disk includes a computer program product for executing instructions according to the present invention. The computer program product includes instructions for receiving the Connect command from provider endpoint 52, instructions for substituting the public connection address for the private connection address, and instructions for sending the modified Connect command to user endpoint 55. A person of ordinary skill in the art will recognize that computer readable medium 91 could be embodied in many different forms, including but not limited to removable magnetic media such as a floppy disk, permanent magnetic media such as a hard drive, optical drives, CD-ROM discs, DVD-ROM discs, or any other medium capable of storing a computer program product.

The primary advantage of the present invention is that it provides a voice firewall having conventional firewall features, as well as additional features that allow communication between a user endpoint and a provider endpoint, even though the user endpoint and the provider endpoint are behind separate firewalls and are essentially invisible to one another.

Even though the voice firewall of the present invention is illustrated with reference to Internet telephony and voice communication, the invention can also be applied in other areas of network communication. One skilled in the art will see that the present invention can be applied in any area where there is a need for transferring data between two devices on separate networks that are each protected by firewalls. Examples of such uses include video communication, text communication (i.e. chatting), and file exchange.

It should be apparent from the foregoing that an invention having significant advantages has been provided. While the invention is shown in only a few of its forms, it is not just limited but is susceptible to various changes and modifications without departing from the spirit thereof.

I claim:

1. A method of providing communication between a provider endpoint at a provider location and a user endpoint at a user location behind a data firewall, the method comprising the steps of;

receiving, by a voice firewall, a connection signal from a soft switch at the provider location, wherein a data portion of the connection signal includes a private connection address associated with the provider endpoint, wherein the voice firewall provides authentication for the user endpoint and said soft switch provides a challenge-response mechanism and maintains a command session with the user endpoint when the user endpoint is authenticated by the voice firewall, and wherein the user endpoint comprises a voice over Internet Protocol device;

modifying the data portion of the connection signal by substituting a public connection address of the voice firewall for the private connection address; and sending the modified connection signal to the user endpoint.

2. The method according to claim 1 further comprising the step of opening a voice communication port, wherein the voice communication port provides a voice line between the user endpoint and the provider endpoint.

3. The method according to claim 1 further comprising the step of opening a voice communication port, wherein the voice communication port is configured to receive signals from the user endpoint at the public connection address and is configured to receive signals from the provider endpoint at the private connection address.

4. The method according to claim 1, wherein the user endpoint is an IP telephone.

5. The method according to claim 4, wherein the IP telephone is behind a conventional firewall.

6. The method according to claim 1, wherein the provider endpoint is a gateway connected to a public switched telephone network.

7. The method according to claim 1, wherein the provider endpoint is an IP telephone.

8. A method of providing connection between a provider endpoint at a provider location and a user endpoint at a user location behind a data firewall, the method comprising the steps of:

receiving, by a voice firewall, a connection signal from a soft switch at the provider location, wherein a data portion of the connection signal includes a private connection address associated with the provider endpoint, wherein the soft switch provides a challenge-response authentication and maintains a command session with the user endpoint when the user endpoint is authenticated;

storing, by the voice firewall, the private connection address;

modifying, by the voice firewall, the connection signal by substituting a public connection address for the private connection address;

opening a voice communication port of the voice firewall to provide communications between the user endpoint and the provider endpoint; and sending the modified connection signal to the user endpoint.

9. The method according to claim 8, wherein the voice communication port is configured to receive signals from the user endpoint at the public connection address and is configured to receive signals from the provider endpoint at the private connection address.

10. The method according to claim 8, wherein the user endpoint is an IP telephone.

11. The method according to claim 8, wherein the provider endpoint is a gateway connected to a public switched telephone network.

12. The method according to claim 8, wherein the provider endpoint is an IP telephone.

13. A voice firewall comprising:
a command input port;
a command output port;
a processor electrically connected to the command input port and the command output port, wherein the processor is configured to receive a connection signal through the command input port, wherein the processor is further configured to substitute a public connection address of the voice firewall for a private connection address of a provider endpoint embedded within a data portion of the connection signal thereby hiding the private connection address, wherein the voice firewall is adapted to authenticate a user endpoint located behind a data firewall and that is provided a challenge-response with a soft switch, and wherein the user endpoint is addressed in the connection signal; and a voice communication port electrically connected to the processor, wherein the voice communication port is associated with the private connection address on a private side of the voice firewall and is associated with the public connection address on a public side of the voice firewall.

14. The voice firewall according to claim 13, wherein the voice communication port is opened by the processor after receipt of the connection signal.

15. The voice firewall according to claim 13, wherein the command input port and the command output port provide a conduit through the voice firewall for a command session between a soft switch at a provider location and a user endpoint at a user location.

16. The voice firewall according to claim 13, wherein:
the command input port and the command output port provide a conduit through the voice firewall for a command session between a soft switch at a provider location and a user endpoint at a user location; and
the processor authenticates signals from user endpoint prior to initiation of the command session.

17. The voice firewall according to claim 13, wherein:
the processor is electrically connected to a provider location on the private side of the voice firewall and is electrically connected to a user location on the public side of the voice firewall; and
the processor facilitates communication between a user endpoint at the user location and a provider endpoint at the provider location.

18. A computer program stored on a computer-readable medium comprising:

instructions for receiving, by a voice firewall, a connection signal from a provider endpoint at a provider location;

instructions for substituting a public connection address for a private connection address embedded within a data portion of the connection signal, wherein the voice firewall provides authentication for the a user endpoint that is provided a challenge-response by a soft switch and said soft switch maintains a command session with the user endpoint when the user endpoint is authenticated by the voice firewall; and instructions for sending the modified connection signal to user endpoint at a user location behind a data firewall, wherein the user endpoint comprises a voice over Internet Protocol device.

19. The computer-readable medium according to claim 18 further comprising instructions for storing the private connection address.

20. The computer-readable medium according to claim 18 further comprising instructions for opening a voice communication port to provide communications between the user endpoint and the provider endpoint.

21. The computer-readable medium according to claim 18, wherein the provider endpoint is a gateway connected to a public switched telephone network.

22. The computer-readable medium according to claim 18, wherein the provider endpoint is an IP telephone.

23. A method of providing voice communication between two endpoints including an endpoint located behind a data firewall over a digital network, the method comprising the steps of:

providing, by a soft switch, a challenge-response to the endpoint; receiving, by a voice firewall, a Connect command that includes a private connection address of a provider endpoint embedded in a data portion of the Connect command, wherein the voice firewall is adapted to authenticate the end point;

modifying, by the voice firewall, the Connect command to substitute a public connection address of the voice firewall for the private connection address thereby biding the private connection address; and sending the modified Connect command to the endpoint.

* * * * *